United States Patent [19]

Takahara et al.

[11] 3,891,796

[45] June 24, 1975

[54] POSITIONING AND MOUNTING MEANS FOR A FLEXIBLE VIDEO DISK

[75] Inventors: Ichiro Takahara; Tadahiko Yabu; Jihei Fujita, all of Osaka, Japan

[73] Assignee: Sanyo Electric Company, Ltd., Osaka, Japan

[22] Filed: Dec. 7, 1973

[21] Appl. No.: 422,865

[30] Foreign Application Priority Data

Dec. 8, 1972 Japan .......................... 47-123551

[52] U.S. Cl...... 178/6.6 DD; 179/100.4 R; 360/102; 360/86; 360/99; 360/133

[51] Int. Cl. .......................................... H04n 3/00

[58] Field of Search.......... 179/100.4 R; 360/72, 86, 360/103, 135, 133, 97, 98, 99; 178/6.6 TP

[56] References Cited

UNITED STATES PATENTS

| | | | |
|---|---|---|---|
| 3,281,153 | 10/1966 | Logan | 179/100.4 R |
| 3,409,746 | 11/1968 | Skov et al. | 360/72 |
| 3,789,160 | 1/1974 | Bruer et al. | 360/86 |

*Primary Examiner*—Bernard Konick
*Assistant Examiner*—David K. Moore
*Attorney, Agent, or Firm*—Armstrong, Nikaido & Wegner

[57] ABSTRACT

A video disc player of the type having a stationary table and a motor-coupled, rotatable spindle, and utilizing a flexible foil-type disc record adapted to be driven about its center at a predetermined speed together with the rotatable spindle while it hovers on a rotation-induced air cushion above the stationary table, which comprises a record mount mounted on the rotatable spindle and a chucking device cooperative with the record mount for firmly holding the disc record for rotation together with the rotatable spindle. The chucking device includes a cylindrical block and a tapered projection extending from the block and engageable in a socket formed in the record mount. The projection engages in the socket through the central opening of the disc record while the latter is sandwiched between the record mount and the cylindrical block.

3 Claims, 13 Drawing Figures

POSITIONING AND MOUNTING MEANS FOR A FLEXIBLE VIDEO DISK

Figure 1:
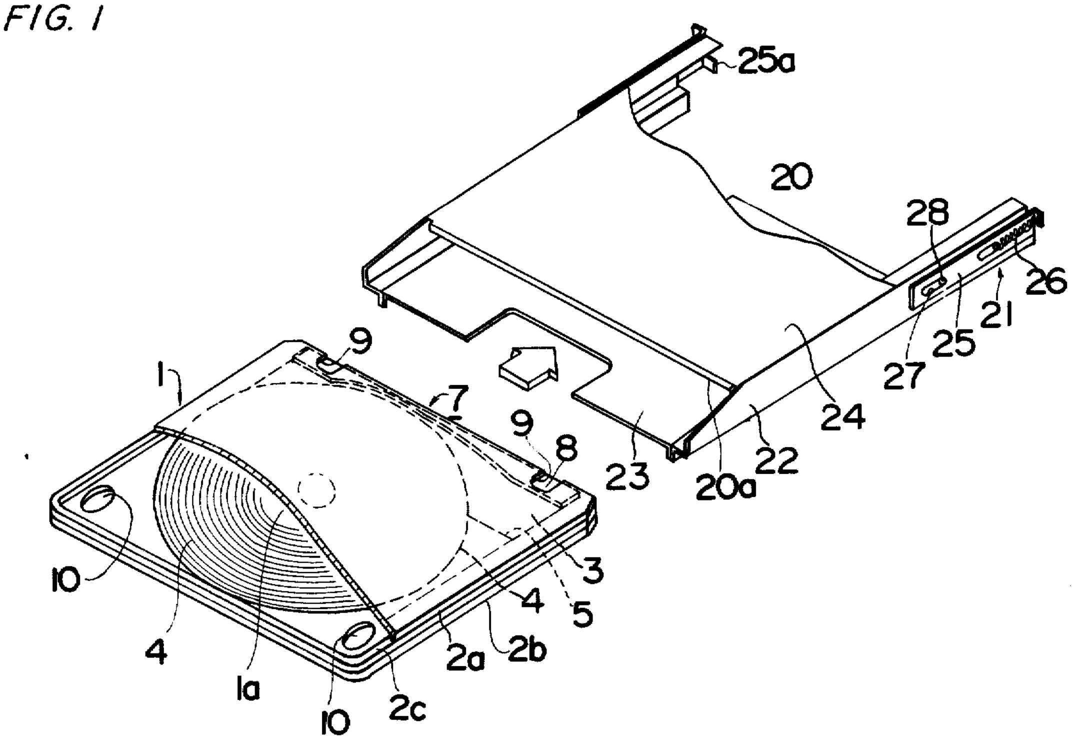

The present invention relates to a video disc player of the type which utilizes a flexible foil-type disc record made of synthetic material such as polyvinly chloride.

This type of video disc player is known as an instrument capable of mechanical playback or reproduction, through television receivers, of video or video and audio information previously recorded in the groove on the disc record. Usually, the groove on the disc record inwardly spirally extends to provide information carrier tracks corresponding in number to the number of turns of the groove. One or both of video and audio signals are recorded in this groove after having been frequency-modulated.

In order, for example, to reproduce video information, i.e., one or both of the video and audio signals, that has been recorded on the disc record, a known video disc player employs a disc record driving system by which the disc record is driven only at its center at a relatively high speed, for example, at 1,800 rpm. and, while being rotated, hovers on a rotation-induced air cushion above a stationary plate or table. A scanner having a scanning stylus moves across the disc record in the radial direction with the scanning stylus mechanically engaged and guided in the spiral groove on the disc record.

Unlike the physical nature of a phonograph record, the spiral groove in the video disc record has a track-to-track spacing of less than 10 $\mu$ and the thickness of the video disc record is in the order of 100 $\mu$. Furthermore, the video disc record is very light-weight and has a relatively high flexibility.

Because of the physical nature of the video disc record and in order to keep a good reproducibility for a substantially long period of time, each video disc record should be carefully treated or handled and be stored in a protective jacket when in no use. The use of the jacket for protection of the video disc record is truly advantageous in one respect, but in another respect disadvantageous in that the disc record must be taken out of the jacket, when it is to be placed on the video disc player, and, during this process of taking out of the jacket, one cannot avoid touching the groove surface of the disc record. The worst of all that may happen because of the thin feature of the disc record during the process of taking the disc record out of the jacket with hands of the operator would be adhesion of dust on his hands somewhere in the disc record which may constitute a major cause for reduction in the reproducibility.

This sort of difficulty in handling the lightweight, flexible disc record is imposed on the potential user of the video disc player not only when he intends to take the disc record out of the protective jacket, but also when the disc record is to be placed in position on the video disc palyer and subsequently to be removed from the same player and again insert it into the protective jacket for storage of the disc record.

On the other hand, in order to drive the disc record at a relatively high speed while being permitted to simultaneously hover on the rotation-induced air cushion above the stationary table, the disc record driving system employed in the conventional video disc player comprising a rotatable spindle having one end coupled to a motor and the other endstepped to provide a threaded, reduced diameter portion with the step providing an annular rest for the disc record. The disc record is, when to be placed on the video disc player, mounted on the step with the threaded portion of the rotatable spindle extending through the central opening of the disc record, and if firmly held in position sandwitched between the step and a fastening cap threaded to the threaded portion of the rotatable spindle. In operation, rotation of the rotatable spindle with the disc record thereon accompanies a corresponding rotation of the disc record and, during the rotation of the latter, a radially outwardly flowing air stream is induced between the rotating disc record and the stationary table, which air stream substantially acts as an air cushion for the disc record supported in air.

In this conventional device, in addition to the difficulty in handling of the disc record described above, an additional disadvantage obviously resides in that the fastening cap should be fastened and undone respectively before and after the reproducing operation.

Accordingly, an essential object of the present invention is to provide a video disc player utilizing comprises flexible foil-type disc record, which substantially satisfactorily eliminates the above mentioned disadvantages inherent in the conventional device of a similar kind.

Another important object of the present invention is to provide a video disc player of the type referred to above, wherein a disc record chucking device is provided for engaging the disc record to a rotatable spindle thereby to permit the disc record to be rotated together with the rotatable spindle and also for disengaging the disc record from the rotatable spindle when the disc record is to be removed from a stationary table.

A further object of the present invention is to provide a video disc player of the type referred to above, wherein said disc record chucking device comprises a substantially cylindrical block having a downwardly extending projection, a record mount rigidly carried by the rotatable spindle and having a socket for receiving therein the projection of said cylindrical block for firmly holding the disc record between said cylindrical block and said record mount, said cylindrical body and said record mount both rotatable together with the rotatable spindle.

A still further object of the present invention is to provide a video disc player of the type referred to above, wherein the cylindrical body of the disc record chucking device is movable between two positions in response to setting of an manually adjustable operating knob; when said body is in one position, the projection of the cylindrical body is disengaged from the socket in readiness for mounting of the disc record and, when said body is in the other position, said body magnetically contacts the record mount with the projection extending through the central opening of the disc record and received in the socket in the record mount.

A still further object of the present invention is to provide a video disc player of the type referred to above, wherein the disc record chucking device facilitates a ready and easy removal of the disc record from the rotatable spindle only by adjusting the operating knob.

Figure 2:
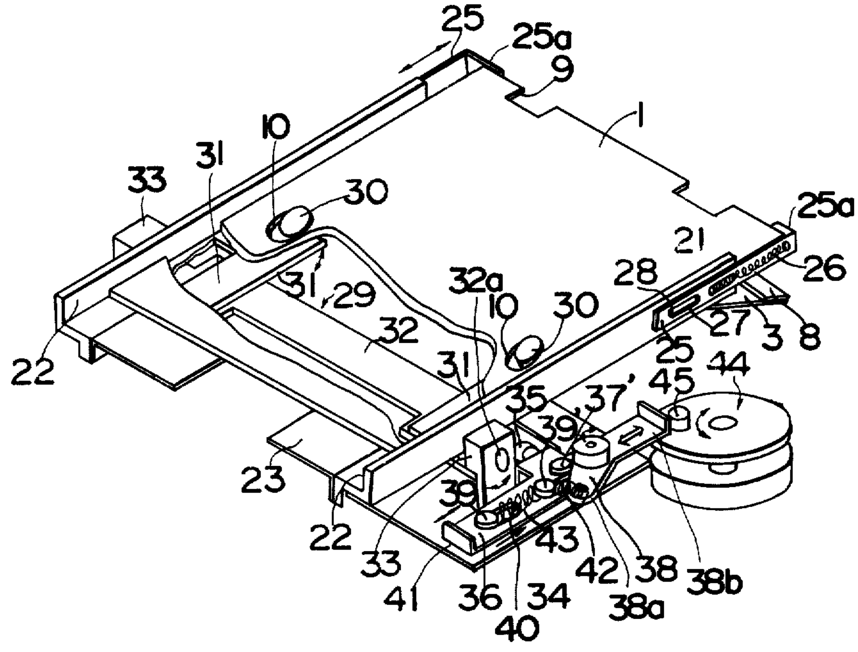
Figure 3:
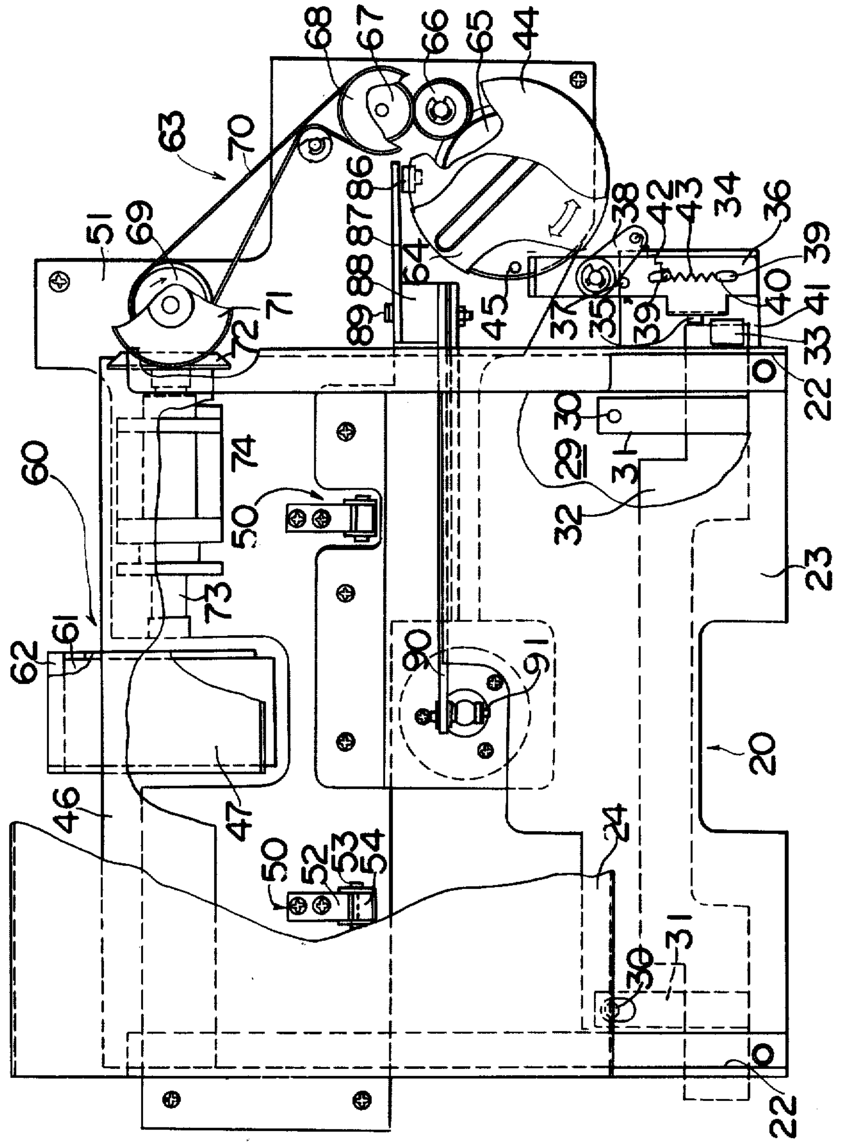
Figure 4:
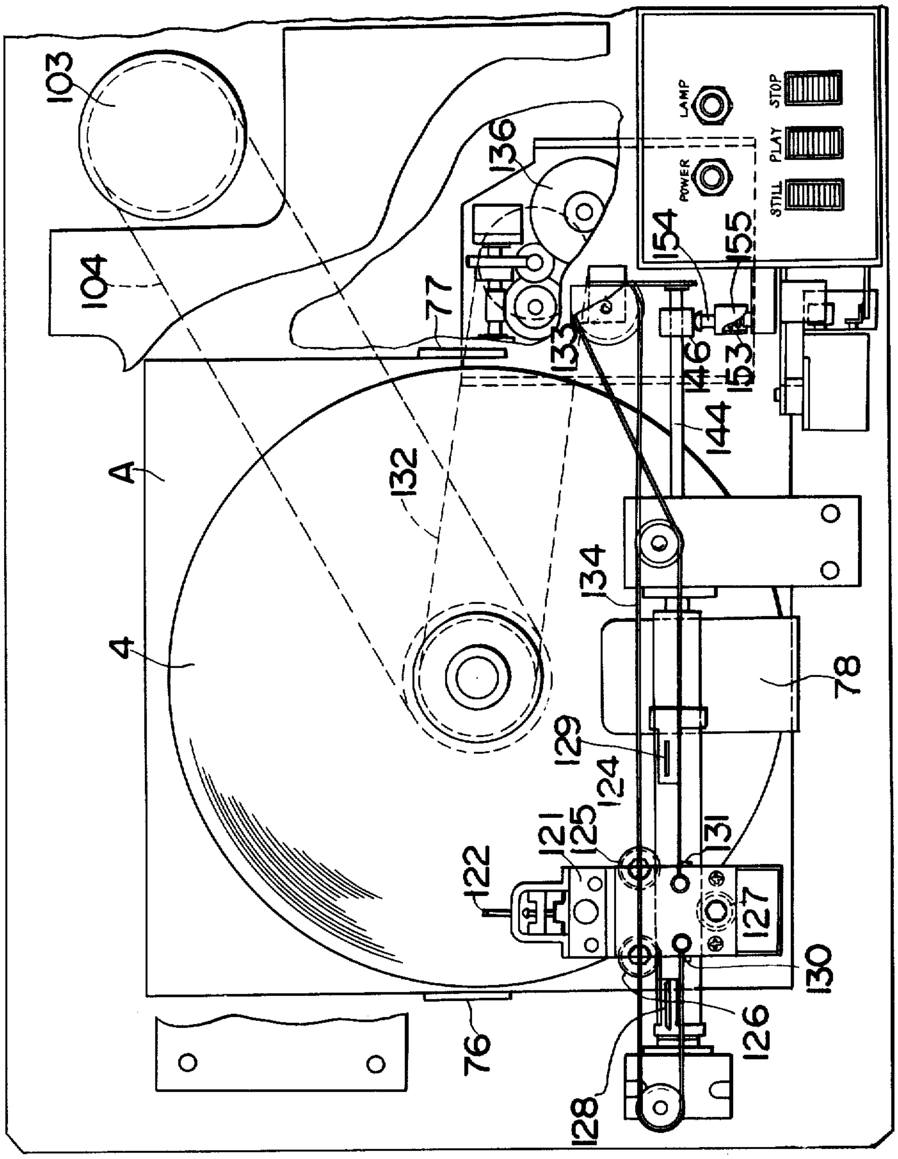
Figure 5:
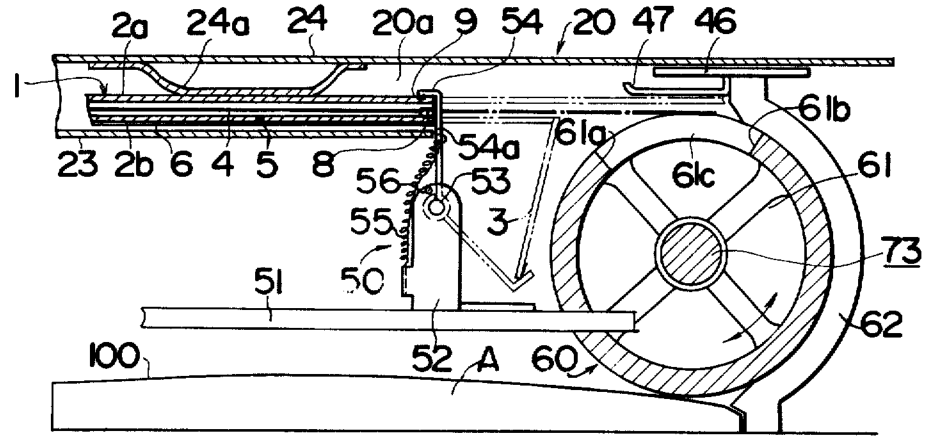
Figures 6, 8:
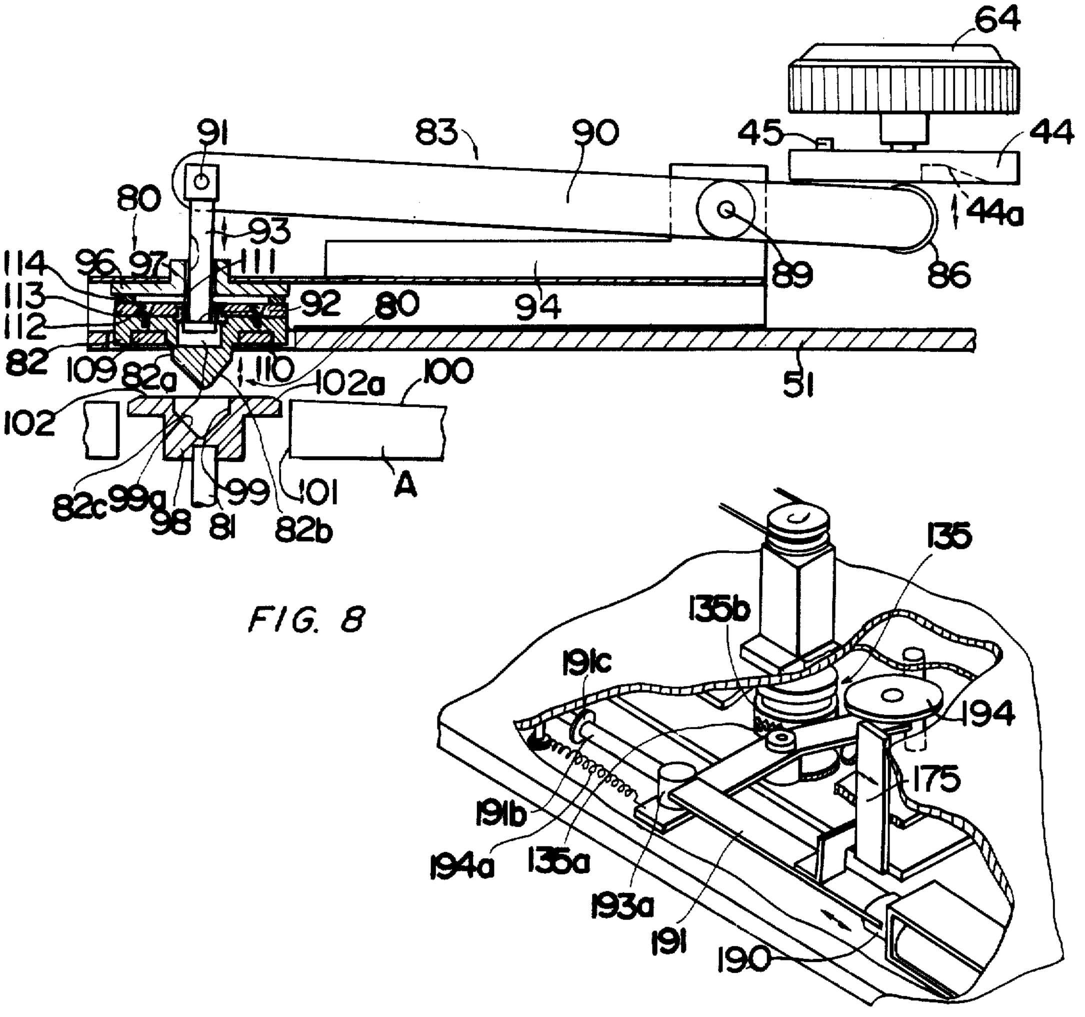
Figure 7:
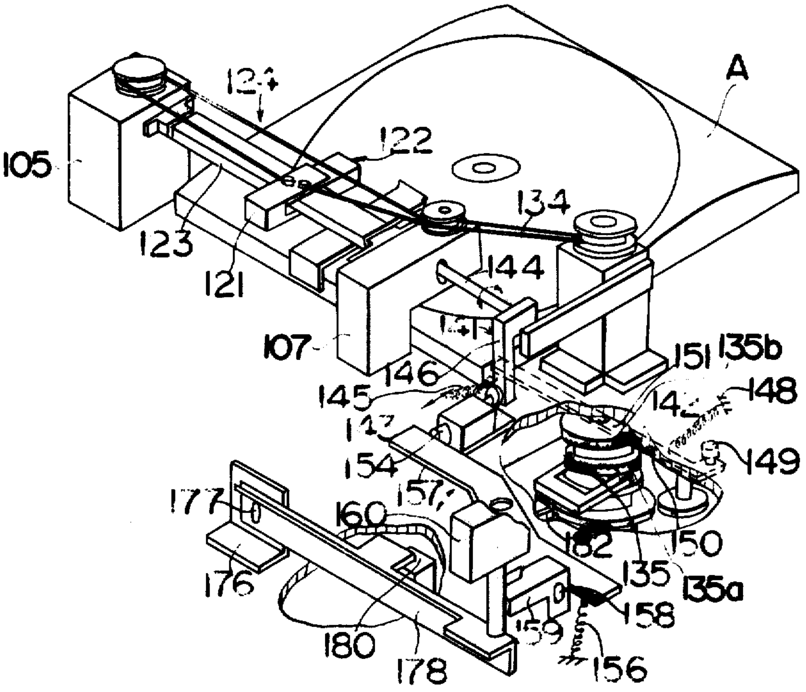
Figure 9:
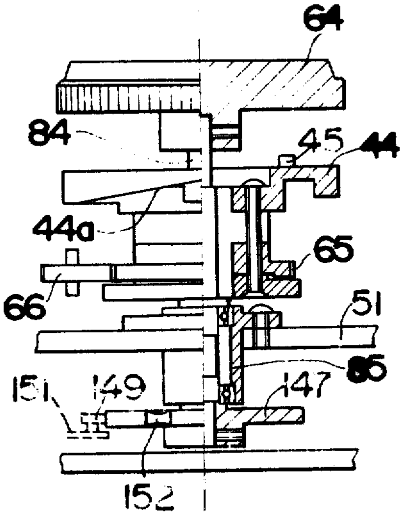
Figure 11:
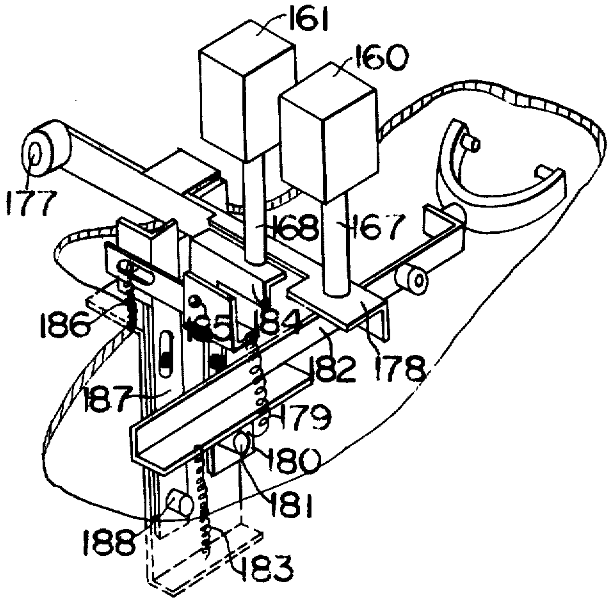
Figure 10:
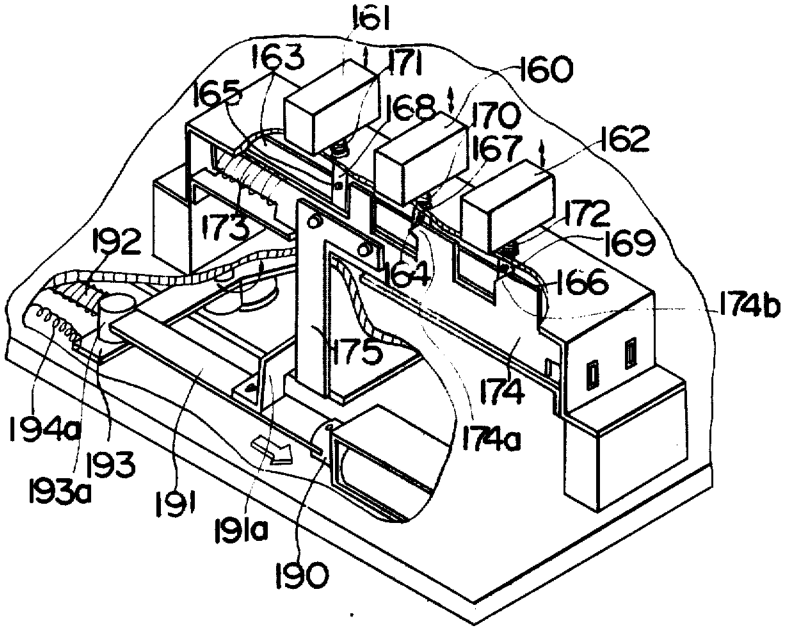
Figure 12:
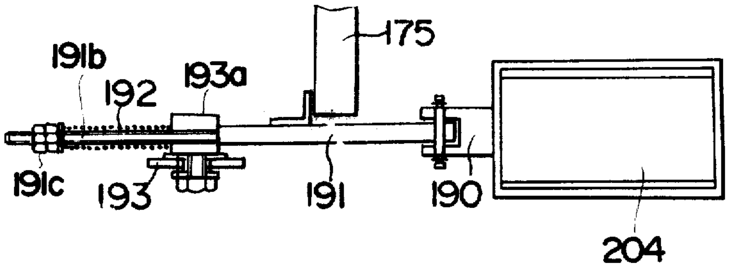
Figure 13:
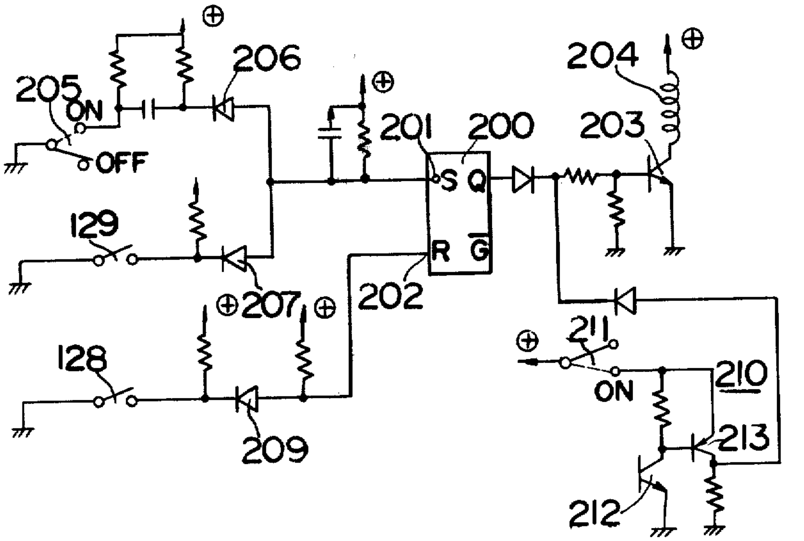

In any event, these and other objects and features of the present invention will become apparent from the following description taken in conjunction with a preferred embodiment thereof with reference to the accompanying drawings, in which:

FIG. 1 is a perspective view, partially in section, of a jacket for accommodating therein a disc record, which is developed for use in association with the video disc player of the present invention, FIG. 2 is a perspective view of a disc record jacket holder provided with a jacket locking and ejecting device, employed in the video disc player of the present invention, FIG. 3 is a top plan view, partially broken away, of an upper half of the video disc player of the present invention, FIG. 4 is a similar view to FIG. 3, showing a lower half of the video disc player of the present invention, FIG. 5 is a side sectional view of a disc record feed unit associated with the jacket holder, FIG. 6 is a side sectional view of a disc record chucking device employed in the video player of the present invention, FIG. 7 is a perspective view, on a reduced scale, of a scanner movement control unit employed in the video disc player of the present invention, FIG. 8 is a schematic perspective view of a clutch arrangement in the video disc player of the present invention, FIG. 9 is a side elevational view, partially in section, of an operating knob employed in the video disc player of the present invention, FIG. 10 is a schematic perspective view of a mode selector unit employed in the video disc player of the present invention, FIG. 11 is a schematic perspective view of a portion of the mode selector unit of FIG. 10, showing a manner by which it is associated with the clutch arrangement, FIG. 12 is a side view of a solenoid plunger and its related parts, and FIG. 13 is an electrical circuit diagram showing a manner to associate the solenoid plunger with various switching elements, employed in the video disc player of the present invention.

Before the description of the present invention proceeds, it should be noted that like parts are designated by like reference numerals throughout the accompanying drawings. It is also to be noted that the terms "performance" hereinafter used in association with a disc record in such a way as "performance of a disc record" should be understood as meaning mechanical reproduction or playback of information, either video or video and audio, previously recorded in the spiral groove on the video disc record in view of the fact that most video disc players are developed for the purpose of reproducing the information.

In general, a vido disc player constructed in accordance with the present invention comprises a jacket locking and ejecting unit; a disc record feed unit; a disc record chucking unit for engaging a disc record, fed by the disc record feed unit through the jacket locking and ejecting unit onto a stationary table, to a rotatable spindle for rotation together with said spindle during performance of the disc record and disengaging said disc record from the rotatable spindle after the performance has completed; a scanner movement control unit for moving the scanner in a vertical direction transverse of the plane of a disc record rotating about the rotatable spindle and for permitting the scanner to move across the rotating disc record towards the rotatable spindle with the scanning stylus in sliding engagement with the groove on the disc record during performance of the disc record; and a mode selector unit for selectively conditioning the video disc player to perform a normal or ordinary reproduction and to perform a still reproduction.

For better understanding of the present invention, these various units of the video disc player according to the present invention will be individually described in the order given above with reference to particular one or ones of the accompanying drawings. However, since it would be advisable to describe the construction of a disc record protective jacket useable on the video disc player of the present invention because of a particular construction of the jacket locking and ejecting unit and disc record feed unit herein disclosed, so will now be done preceding the description of the various units of the video disc player.

Disc Record Jacket [FIGS. 1 and 5]

Referring to the drawings, a protective jacket, generally designated by 1 and of substantially square shape, comprises a pair of upper and lower plates **2*a* and 2*b* joined to each other by means of a spacer 2*c* of substantially U-shaped configuration so that a disc record accommodating room 2 is formed between said plates 2*a* and 2*b*. The room 2 is preferably so sized that a flexible foil-type disc record 4 is steadily held therein without arbitrarily moving within said room 2 during, for example, transportation from place to place. All the elements forming the protective jacket 1** so far described are preferably made of synthetic material having a sufficient hardness and may be integrally formed, otherwise molded, into a single piece construction.

The front edges of the upper and lower plates **2*a* and 2*b*, which are not joined to each other by means of the spacer 2*c*, provide an opening 1*a* of the protective jacket 1, said opening 1*a*** being selectively closed and opened in a manner as hereinafter described.

The lower plate **2*b* is provided as at 5 with a line of weakness, for example, in the form of a V-shaped groove, which extends widthwise in parallel to and spaced a predetermined distance from the plane of the front edges of said plates 2*a* and 2*b*. A front portion of the lower plate 2*b* distincted from the rest of said plate 2*b* by the line of weakness 5 serves as a hinged lid as designated by 3. The whole outer surface, including that of the lid 3, of the lower plate 2*b* are plated with a sheet 6 of polyvinyl chloride for avoiding a possible separation of the lid 3 from the rest of the lower plate 2*b* which may otherwise take place upon frequently repeated bending along the line of weakness 5. It should be noted that the polyvinyl sheet 6 may bear thereon any designation identifying the disc record 4 accommodated within the room 2 and/or any description or representation concerning the disc record 4 within the room 2**, either printed or labelled.

A band of magnetizable material is provided as at 8 on the front inner surface of the lid 3 and extends in parallel to the plane of the front edges of the plates **2*a* and 2*b***, the function of which will become clear from the subsequent description.

The upper plate **2*a* is formed at its front edge with a pair of spaced notches 9 through which finger members 54, supported in position in a manner as described under the heading of "Disc Record Feed Unit," engage to the lid 3 for swinging the latter about the line of weakness 5 for opening said opening 1*a***. Although not shown, a portion of the inner surface of the upper plate 2a adjacent the front edge thereof is plated with a band of ferrous material, for example, a metallic foil, which cooperates with the magnetizable band 8 to tightly close the opening 1a when said ferrous band and said magnetizable band 8 relatively attract each other.

The ferrous and magnetizable bands may be reversed in position with respect to the members to which they are respectively applied. Furthermore, instead of the employment of the two notches 9, a single notch may be employed and, in either case, each notch 9 is preferably so sized as to permit the user of the video disc player to open the jacket 1 whenever he desires by any reason or for some purpose.

The jacket 1 is formed on the lower plate 2b with a pair of spaced holes 10 preferably adjacent to the rear of the jacket 1, the function of which will be described later.

Jacket Locking And Ejecting Unit [FIGS. 1 to 3]

This jacket locking and ejecting unit basically comprises a jacket holder 20 for receiving the disc record containing jacket 1, of the construction as hereinbefore described, in readiness for performance of the disc record 4 contained in said jacket 1, a locking device 29 for locking the jacket in position within said holder 20 after it has been completely inserted into the jacket receiving chamber of said jacket holder 20, an ejecting device 44 for ejecting the jacket 1 out of the holder 20 after the performance of the disc record 4 and a release device 34 for releasing said locking device 29.

Referring to the drawings, the jacket holder 20 comprises a pair of guides 22 of substantially L-shaped section spaced from each other a predetermined distance corresponding to the width of the jacket 1 used. These guides are connected to each other by a pair of upper and lower plate members 24 and 23 spaced from each other a predetermined distance corresponding to the thickness of the same jacket 1. The space defined as a 20a by these guides 22 and plate members 23 and 24 provides a jacket receiving chamber into which the jacket 1 can be inserted in readiness for performance of the disc record contained in the jacket 1.

The jacket holder 20 is provided with a biasing device 21 on both sides of said jacket holder 20 for permitting the once-inserted jacket to tend to move rearwards with respect to the direction of insertion thereof as indicated by the arrow in FIG. 1, said biasing device cooperating with the ejecting device 44 of a construction as will be subsequently described. Each biasing device 21 comprises a substantially L-shaped slider 25 having a stop 25a engageable with the front edge of the jacket 1 as the latter is inserted into the jacket receiving chamber 20a. This slider 25 is slidable along and in the longitudinal direction of the associated guide 22 and so supported by said associated guide 22 by means of a pair of spaced flat-headed pins 28 loosely extending through respective guide slots 27 in the slider 25 and tapped into said associated guide 22. A spring element 26, for example, a tension spring, suspended between one of the pins 27 and a portion of the slider 25 biases said slider in one direction so that the jacket 1, that has been completely inserted within the jacket receiving chamber 20a, can be urged to move counter to the direction of insertion of the jacket 1. The stroke of movement of the slider 25 of each biasing device 21 is defined by the size of the guide slots 27 in cooperation with the associated pins 27.

The locking device 29 comprises a pair of spaced swing bars 31 respectively provided as at 30 with engagement pins 30 adapted to engage in the holes 10 in the lower plate 2b of the jacket 1 through openings (not shown) formed in the lower plate member 23, and a corresponding number of spring elements (not shown) for biasing said swing bars 31 in such a way as to permit the engagement pins 30 to project into the jacket receiving chamber 20a through the associated openings. These swing bars 31 has one end remote from the associated pin 30 rigidly connected to a connecting strip 32, both end of said connecting strip 32 being formed with upwardly extending arms 33 which are in turn respectively supported by the guides 22 of the jacket holder 20 through pin members 32a for rotation about said pin members 32a. It should be noted that the connecting strip 32 extends below the lower plate member 23 of the jacket holder 20 with the arms 33 thereof positioned outside said jacket holder 20.

It is also to be noted that an end face of each of the engagement pins 30 opposed to the associated swing bar 31 is preferably downwardly inclined towards the entrance of the jacket receiving chamber 20a, i.e., in a direction counter to the direction of insertion of the jacket 1 into said chamber 20a, for the purpose of enabling said pins 30 to be downwardly collapsed as the front edge of the jacket 1 being inserted into said jacket receiving chamber 20a relatively slides over said pins 30. When the jacket 1 is completely inserted within the jacket receiving chamber 20a, these engagement pins 30 project through the associated openings in the lower plate member 23, urged by the spring elements (not shown) through the swing bars 31, and, therefore, to hold the jacket 1 firmly within the jacket receiving chamber 20a of the jacket holder 20 with said pins 30 engaged in the holes 10.

The release device 34 for releasing said jacket locking device 29 comprises a support plate 41, the plane of which extends substantially in parallel to the plane of the jacket holder 20 and which is rigidly supported by one of the guides 22 above a chassis 51 (FIGS. 3, 5 and 6), and a slider 36 having an engagement projection formed as at 35 for engagement with the arm 33 of the connecting strip 32, and also having a pivot lever 38. The slider 36 is formed therein a pair of spaced guide slots 40 and slidably supported on said support plate 41 by flat-headed pins 39 respectively loosely extending through said guide slots 40 and tapped into said support plate 41.

The pivot lever 38 has a substantially intermediate portion rotatably mounted on said slider 36 and is biased in one direction, e.g., in a clockwise direction, by a tension spring 42 suspended between one end 38a thereof and one of the pins 40. In this condition, the other end 38b of said pivot lever 38 extends substantially in alignment with the lengthwise direction of the slider 36 and, for this purpose, a stopper 37 is rigidly tapped into said slider 36 for restricting spring-urged rotation of the pivot lever 38 in contact with the end 38a of said lever 38.

The slider 36 carrying thereon said pivot lever 38 is biased in one direction by a spring element, for example, a tension spring 43, in such a way that the end 38b of the pivot lever 38 locates on the path of travel of an ejection pin 45 mounted on a cam wheel 44 coaxially connected to an operating knob 64 (FIG. 6). The ejection pin 45 on the cam wheel 44 is engageable to the end 38*b* of the pivot lever 38 causing the slider 36 to move against the tension spring 43 only when the operating knob 64 and hence the cam wheel 44 is rotated about its center in one direction, e.g., in a counterclockwise direction and, in case of clockwise rotation of said cam wheel 44, the ejection pin 45 causes the pivotal lever 38 to rotate in the counterclockwise direction against the tension spring 42 without moving the slider 36 against the tension spring 43.

In the above construction, movement of the slider 36 against the tension spring 43 effected in the manner as hereinbefore described causes the projection 35 to engage to the arm 33 whereby the connecting strip 32 swings about the axes of the respective pins 32*a*. Therefore, if the disc record jacket 1 is present within the jacket receiving chamber 20*a* of the jacket holder 20, swing of the connecting strip 32 accompanies corresponding movement of the swing bars 31 and therefore the engagement pins 30 are both downwardly collapsed through the holes 10, permitting the inserted jacket 1 to be readily ejected by the biasing devices 21 provided in the jacket holder 20.

A reference numeral 24*a* employed in FIG. 5 represents a depresser, made of spring strip, having one end rigidly secured to the inner surface of the upper plate member 24 of the holder 20 and the other end slidingly contacting said inner surface of said upper plate member 24. As clearly shown, this depresser 24*a* is so curved as to permit the jacket 1 inserted within the jacket receiving chamber 20*a* to be pressed from above. This depresser 24*a* is required only when the space between the upper and lower plate members 24 and 23 of the jacket holder 20 is greater than the thickness of the jacket 1 used.

Disc Record Feed Unit [FIGS. 3 and 5]

This disc record feed unit basically comprises a jacket lid opener 50 for opening the lid 3 of the jacket 1 received in position within the jacket receiving chamber 20*a* of the jacket holder 20 and a record feeder 60 for feeding a disc record 4 within the inserted jacket 1 out of the jacket 1 and onto a stationary table A (FIGS. 4, 5 and 7) of a known construction which is situated substantially below the jacket holder 20 supported by the chassis 51.

Referring now to the drawings, the lid opener 50 comprises an upright support arms 52, which may be of one-piece construction and which is rigidly mounted on the chassis 51, a spindle 53 having both ends journalled, or otherwise rigidly secured, to the upright support arms 52 and a pivotable plate 54*a* having one end rotatably mounted on said spindle 53 between said arms 52 and the other end integrally formed with the finger members 54 spaced from each other in a distance substantially equal to the space between the notches 9, formed in the upper plate 2*a* of the jacket 1 (FIG. 1), for engagement with relevant portions of the lid 3 of the jacket 1. The plate member 54*a* is held in an upstanding position, as shown in FIG. 5, by an overcenter spring 55 while it abuts against one or two retaining pins provided as at 56 to the arm or arms 52.

While in the above construction, the lid opener 50 operates in such a manner as follows. As the jacket 1 is inserted into the jacket receiving chamber 20*a* of the jacket holder 20 with the front edge of the jacket 1 approaching towards the stops 25*a* of the biasing devices 21 (FIG. 1), the front edge of the lid 3 contacts the plate member 54*a* with the finger members 54 positioned immediately above the notches 9 and subsequently causes the plate member 54*a* to pivot above the spindle 53 against the overcenter spring 55. Further insertion of the jacket 1 into the receiving chamber 20*a* causes the finger members 54 to engage the lid 3 through the associated notches 9 while said plate member 54*a* continues to pivot about the spindle 53 against the over-center spring 55 and, at the same time as the line of weakness 5 emerges from the rear edge of the lower plate member 23 of the jacket holder 20, the lid 3 is downwardly bent about said line of weakness 5 as shown by the double-dotted chain line in FIG. 5. At the time of completion of the jacket insertion, a portion of the jacket 1 adjacent to the front edge thereof is firmly held in position by a retainer 47, supported in a manner as will be subsequently described, while the lid 3 is completely opened with a front portion of the disc record 4 within the jacket 1 exposed substantially downwards as represented by a single-dot chain line in FIG. 5.

Removal of the once-inserted jacket assisted by the biasing devices 21 results in automatic closing of the lid 3 in contact with the rear edge of the lower plate member 24 of the jacket holder 20 while the plate 54*a* is similarly returned to the upstanding position urged by the over-center spring 55.

Before description of the record feeder 60 is to be made, the stationary table A will be more described.

The stationary table A is known as having a downwardly curved surface 100 on which the disc record to be performed rests and also having at its center a central opening through which a rotatable spindle 81 (FIG. 6) loosely extends for driving the disc record 4 above said stationary table A.

The record feeder 60 includes a transfer roll 61 of substantially cylindrical shape for transferring the disc record 4 between the jacket 1 in the jacket holder 20 and the stationary table A, as semi-circular guide 62 cooperating with said transfer roll 61 in such a way as to hold the disc record between it and the outer peripheral surface of said transfer roll 61 during transfer of the disc record 4 therebetween, and a transfer roll drive system 63 for rotating said transfer roll in response to operation of the operating knob 64, i.e., rotation of the cam wheel 44.

The transfer roll 61 is rotatably supported in position as shown in FIG. 3 and mounted on a shaft 73 for rotation together with said shaft 73. This transfer roll 61 is provided with at least one cut-out portion 61*c* on the peripheral wall thereof, said cut-out portion 61*c* being defined by a pair of opposed edges 61*a* 61*b*. The outer peripheral surface of said transfer roll 61 is in practice lined with soft rubber or foam material or any other suitable material having a relatively high frictional coefficient, although the lining is not shown for the sake of simplification of the drawings.

Opposed to the transfer roll 61, the guide 62 of substantially semi-circular cross section is rigidly supported above a chassis base which locates below the chassis 51 and which may be the stationary table A. This guide 62 has an inwardly rounded smooth surface, which fits to the curvature of the cylindrical wall of the transfer roll 61, and is so positioned relative to the transfer roll 61 as to ensure, with no fault, transfer of the disc record 4 in a curved path while said disc record 4 is sandwitched between said transfer roll 61 and said guide 62 with the grooved surface thereof in contact with the lining on the transfer roll 61 and the opposed surface thereof in sliding contact with the inwardly rounded smooth surface of the guide 62, a detailed manner of transfer being subsequently described. It should, however, to be noted that the outer circumference of the transfer roll 61 be determined in consideration of the outer diameter of the disc record to be used in association therewith, although the illustrated embodiment employs the transfer roll having the outer circumference substantialiy equal to the outer diameter of the disc record.

Rotation of this transfer roll 61 is effected by operating the operating knob 64 which is manually adjustable to angularly reciprocate within approximately 360° and, however, at the time of complete insertion of the jacket 1 into the jacket receiving the chamber 20*a* of the jacket holder 20, the operating knob 64 should be always positioned so that the cut-out portion 61*c* of the transfer roll 61 is ready to accommodate therein the front of the disc record 4 which has been exposed thereto upon opening of the lid 3 of the jacket 1 with no edges 61*a* and 61*b* of the transfer roll 61 contacting the disc record 4. Rotation of the transfer roll 61 in a clockwise direction causes the edge 61*a* thereof to engage to the exposed front of the disc record 4 and, subsequently accompanies a corresponding movement of the disc record 4, pulling the latter out of the jacket 1 within the jacket holder 20 and onto the curved path between the transfer roll 61 and the guide 62. This is possible because, as hereinbefore described, the outer peripheral surface of the transfer roll 61 is provided with the lining of relatively high frinctional coefficient and, therefore, no slip occur between the edge 61*a* and the disc record 4.

Further rotation of the transfer roll 61 through, for example, 180° from the position as shown in FIG. 5, results in positioning of the cut-out portion 61*c* immediately above the stationary table A while that portion of the disc record that has been accommodated in said cut-out portion 61*c* slides in contact with the stationary table A. It should be noted that the disc record 4 is so elastic that it tends to stretch straight and, therefore, once the front of said disc record 4 contacts the stationary table A, it rests on the stationary table A without curling.

At the time of one and a half rotation of the transfer roll 61 from the original position, i.e., upon completion of full adjustment of the operating knob 64, the cut-out portion 61*c* of the transfer roll 61 again comes immediately above the stationary table A and the disc record 4 comes to rest in its entirety on the stationary table A with the edge 61*b* spaced from the disc record in a distance sufficient to permit the disc record not to contact said edge 61*b* during air-cushioned rotation of said disc record.

Reverse rotation of the transfer roll 61 in the counterclockwise direction brings the disc record 4 on the stationary table A back to the jacket 1 within the jacket holder 20, transferred in a substantially similar manner as in the transference from the jacket 1 onto the stationary table A. However, it should be noted that, shortly before the reverse rotation of said transfer roll 61 completes, the disc record 4 is completely inserted in position within the jacket 1 and, at the time of completion of the reverse rotation, the edge 61*a* of the transfer roll 61 comes under the disc record 4.

Although the transfer roll 61 operates in the manner as hereinbefore described, the transfer roll 61 is operatively associated, as will become clear from the subsequent description, with the releasing device 34, described under the heading of "Jacket Locking and Ejecting Unit," through the cam wheel 44 coaxial with the operating knob 64 in such a way that, upon completion of the above mentioned reverse rotation of the transfer roll 61, the ejection pin 45 on the cam wheel 44 then rotating counterclockwise causes the slider 36 to move against the tension spring 43, in the manner already described, to ultimately permit the jacket 1 in the jacket holder 20 to be ejected out of the holder 20 after said jacket 1 has received the disc record 4 into the room 1*a* of said jacket 1.

The transfer roll drive system 63 will now be described. This transfer roll drive system 63 operatively associates the transfer roll 61 with the operating knob 64 to enable the former to function in the manner as hereinabove described. Before this description proceeds, attention is called to FIG. 9, wherein the cam wheel 44 is shown in detail.

Referring to FIG. 9, the cam wheel 44 includes a gear 65, which may be integrally formed with said cam wheel 44 through shown is in the form of an assembly made up of a plurality of disc members of different diameters. This cam wheel 44 including the gear 65 is mounted on a shaft 84 having one end rigidly mounted with the operating knob 64 and the other end extending through a bearing sleeve 85, rigidly carried by the chassis 51, and being situated below said chassis 51. It should be noted that the operating knob 64 and the cam wheel 44 are, in practice, respectively situated outside and inside a housing structure (not shown) of the video disc player.

Referring back to FIG. 3, the gear 65 is in mesh with an intermediate gear 66 which is in turn meshed with a driven gear 67, said gears 66 and 67 being operatively supported on the chassis 51. The driven gear 67 is integrally formed with a pulley 68 around which an endless belt 70 is mounted for transmitting rotation of the pulley 68 to a driven pulley 69 which is also mounted on the chassis 51. The driven pulley 69 is integrally formed with a bevel gear 71 constantly meshed with a counteracting bevel gear 72 which is rigidly mounted on the transfer roll drive shaft 73. Between the counteracting bevel gear 72 and the transfer roll 61, a bearing device 74 is mounted on the chassis 51 for rotatably supporting said shfat 73 and said transfer roll 61.

From the foregoing, it is clear that clockwise rotation of the operating knob 64 as viewed from FIG. 3 results in clockwise rotation of the transfer roll 61 as viewed from FIG. 5.

It should be noted that, although in the foregoing description the transfer roll 61 has been described as having the outer periphery substantially equal to the disc record to be used in association therewith, it may have the outer periphery smaller than the outer diameter of the disc record provided that the transfer roll drive system 63 be suitably designed such as to permit the cut-out portion 61*c* of the transfer roll 61 to assume the definite positions, described above, during substantially 360° rotation of the operating knob 64. Furthermore, rotation of the operating knob 64 may not be limited to 360° depending upon the design of the transfer roll drive system 63. By way of example, so far as the size of the transfer roll 61 is concerned, it may be made to rotate three times during each transfer of the disc record from the jacket 1 onto the stationary table A or from the stationary table A back to the jacket 1 if the outer periphery of said roll 61 is substantially equal to half the outer diameter of the disc record to be used. In any event, various combinations are possible as regards the required number of relative rotation of the transfer roll 61 and the operating knob 64 provided that the cut-out portion 61*c* be made to assume the definite position as hereinbefore described. In addition, the number of the cut-out portion 61*c* may be not limited to one, but two or more cut-out portions can be employed.

In the drawing of FIG. 4, reference numerals 76 and 77 represent a pair of opposed guides spaced in a distance slightly greater than the outer diameter of the disc record 4 for avoiding lateral displacement of said record during sliding movement of the disc record on the stationary table A as said disc record is transferred by the transfer roll 61 onto said stationary table A. A reference numeral 78 represents a stopper for avoiding an overun of the disc record 4 thus transferred onto said stationary table A.

The retainer 47 is supported in position by a bridging plate 46 which also supports in position the guide 62 as shown in FIG. 5.

Disc Record Chucking Unit [FIGS. 3, 4, 6 and 9]

This disc record chucking unit is adapted to engage to the rotatable spindle 81 the disc record that has been supplied onto the stationary table A from the jacket 1 within the jacket holder 20 through the disc record feed unit, for the purpose of enabling the disc record to be rotated together with the rotatable spindle at a predetermined high speed.

As best shown in FIG. 6, the rotatable spindle 81 having a lower end operatively coupled to a motor 103 (FIG. 4) through a power transmission belt 104 has an upper end portion rigidly mounted with a record mount 98 of such a shape as will now be described. The record mount 98 is of substantially cylindrical shape and has a socket formed as at 99 therein. This socket 99 extends inwardly of the record mount 98, the bottom of which is preferably downwardly tapered as at 99*a* towards the axis of the rotatable spindle 81, and has a record mounting surface 102 which lies in the level slightly higher than the level of the stationary table A while an upper peripheral edge of said record mount, indicated as at 102*a*, is radially downwardly inclined towards a position below the level of the stationary table A so that the disc record moving on the stationary table A can slide over the record mount 98 onto the record mounting surface 102.

The rotatable spindle 81 having the record mount 98 of the above construction attains the predetermined high speed of rotation at the time the disc record 4 is held in position on the stationary table A with the central opening of said record aligned with the socket 99. For this purpose, the motor 103 is preferably operated in response to a switch (not shown) actuated upon completion of insertion of the jacket 1 into the jacket receiving chamber 20*a* of the jacket holder 20.

Disposed immediately above the record mount 98 on the rotatable spindle 81 is a chuck generally indicated by 80, which is operatively associated with the cam wheel 44 through a chucking control mechanism 83.

The chuck 80 comprises a substantially cylindrical body 82 having a lower end face integrally formed with a projection 82*a* of a diameter substantially equal to the diameter of the central opening of the disc record, said projection 82*a* having a downwardly tapered cone 82*b* which mates in shape to the bottom 99*a* of the socket 99. The body 82 is formed with a downwardly recessed cavity 82*c* in alignment with said projection 82*a*. Around the opening of said cavity 82*c*, a ball bearing 111 is mounted on the cylindrical body 82 and held in position by an annular plate 113 secured to the opposed upper end face of said body 82 by means of a plurality of set screws 112. An annular magnet is rigidly embedded as at 109 in the cylindrical body 82 and facing the record mounting surface 102 of the record mount 98.

For the purpose of avoiding a possible slip which may occur between the lower end face of the cylindrical body 82 and the disc record 4 then rotating about the center thereof while saidwitched between said body 82 and said record mount 98, an annular rubber sheet is plated as at 110 to the lower end of said body 82.

The chuck 80 of the above construction can be vertically shifted between a disengaged position and an engaged position; when said chuck 80 is in the engaged position, said chuck is in position to sandwitch the disc record between the lower end face of the cylindrical body 82 and the record mounting surface 102 of the record mount 98 while the projection 82*a* extends through the central opening of the disc record and is received within the socket 99 in the record mount 98. FIG. 6 illustrates the chuck 80 in the disengaged position.

The chucking control mechanism 83 comprises a support structure 94 rigidly mounted on the chassis 51 and carrying a flanged sleeve 97 which has a flanged portion 96 situated beneath the support structure 94 in contact therewith. This mechanism 83 further comprises a connecting rod 93 having a lower end portion slidable extending through said sleeve 97 and then the inner ring of the ball bearing 111, the lower end extremity thereof being formed with a land 92 situated within the cavity 82*c* and being of a diameter sufficient to engage to the ball bearing 111 from bottom as said connecting rod 93 is upwardly shifted as will be described later, but of a diameter slightly smaller than the diameter of the cavity 82*c*.

A seesaw lever 90 pivotally supported to the support structure 94 by means of a spindle 89 has one end pivotally connected with the opposed upper end of the connecting rod 93 by means of a spindle 91 and the other end rotatably mounted with a cam follower 86, which may be in the form of a roller. The cam follower 86 is always in contact with a helically inclined cam surface formed as at 44*a* in the cam wheel 44. This is possible because the point of pivot of the seesaw lever 90 about the spindle 89 locates relatively close to the cam follower 86 and, therefore, said seesaw lever 90 tends to pivot in such a way as to permit the cam follower 86 to contact said helically inclined cam surface 44*a*. In any event, a biasing element such as a tension spring may be employed to forcibly bias said cam follower 86 to contact said cam surface 44*a*.

From the foregoing description, it has now become clear that positioning of the chuck 80 between the engaged and disengaged positions can be effected by rotating the operating knob 64. More specifically, as the operating knob 64 is rotated clockwise, the seesaw lever 90 pivots counterclockwise as viewed from FIG. 6 with the chuck 80 descending towards the engaged position and, as said operating knob 64 is rotated counterclockwise, the seesaw lever 90 pivots clockwise as viewed from FIG. 6 with the chuck 80 ascending towards the disengaged position. When the chuck is in the engaged position with the disc record sandwitched between said chuck 80 and said record mount 98 while the annular magnet 109 attracts said record mount 98 through the disc record, rotation of the rotatable spindle 81 does not only accompanies a corresponding rotation of the disc record, but also accompanies a corresponding rotation of the chuck 80. At this time, the land 92 on the connecting rod 93 is supported in air within the cavity 82*c*, because the stroke of movement of said connecting rod 83 is selected to be greater than the strike of movement of the chuck 80, i.e., the distance between the engaged and disengaged positions of said chuck 80.

On the other hand, as the chuck 80 is moved towards the disengaged position after the performance of the disc record had completed, the chuck 80 continues rotating about the longitudinal axis thereof under the influence of inertia force while it is supported by the connecting rod 93 through the ball bearing 111. For stopping the inertia rotation of the chuck 80, an annular brake lining 114 is provided as secured to the annular plate 113 or the flanged portion 96 of the flanged sleeve 97. It should be noted that, as the chuck 80 is shifted towards the disengaged position with the projection 82*a* disengaging from the socket 99, the disc record, which is very light-weight, tends to be upwardly lifted by the projection 92*a* engaged in the central opening thereof. However, this does not in practice occur since the disc record 4 is also rotated together with the chuck 80 under the influence of inertia force.

The provision of the downwardly inclined cone 82*b* in the projection 82*a* is advantageous in that, even though the disc record 4 fed by the transfer roll 61 onto the stationary table A rests thereon with the central opening thereof displaced from its alignment with the socket 99, the downwardly inclined cone 82*b* acts during descending movement of the chuck 80 towards the engaged position to align the central opening of the disc record to the socket 99.

While the disc record chucking unit is constructed as hereinbefore fully described, the position of the cam surface 44*a* in the cam wheel 44 should be selected such that arrival of the chuck 80 at the engaged position completes shortly after the transfer roll 61 has completed the transfer of the disc record from the jacket 1 onto the stationary table A.

Scanner Movement Control Unit [FIGS. 4, 7 and 8]

The scanner movement control unit basically comprises a horizontal shift mechanism 120 for moving a scanner across the disc record then rotated about the rotatable spindle 81 while said disc record 4 is firmly sandwitched between the chuck 80 and the record mount 98, and a stylus clearing mechanism 140 for moving the scanner so as to permit the stylus to clear of the groove on the disc record 4.

The horizontal shift mechanism 120 includes a guide rail 123 for guiding a scanner 121 between inner and outer positions in such a way as to permit the stylus 122, carried by said scanner 121 and slidingly engaged in the groove on the disc record 4, to move in the radial direction of said disc record 4, and a drive system 124 for moving said scanner 121 along said guide rail 123 between said inner and outer positions.

The scanner 121 shown carries guide rollers 125, 126 and 127 in contact with the guide rail 123 from both sides thereof and a pair of magnets respectively secured as at 130 and 131 to said scanner 121. As will become clear from the subsequent description, these magnets 130 and 131 are used to operate respective reed switches 128 129 provided on both ends of the guide rail 123. The drive system 124 includes a power transmission rope 134, having both ends thereof connected to the scanner 121, for transmitting a rotational force of the rotatable spindle 81 to the scanner 121 through an endless belt 132 via a reduction gear device 133.

The reduction gear device 133 includes a clutch 135 composed of drive and driven gears 135*a* and 135*b* which are engageable to each other. This clutch 135 operates in such a manner that, when said drive and driven gears 135*a* and 135*b* are meshed to each other, it transmits the rotational force of the rotatable spindle 81 to the scanner 121 through the rope 134 for causing the scanner 121 to move from the outer position to the inner position with the stylus 122 inwardly traversing the disc record 4 and that, when said drive and driven gears 135*a* and 135*b* are disengaged from each other, it permits the transmission of the rotational force of the rotatable spindle 81 to the scanner 121 through the driven gear 135*b* by means of a return drive wheel 136 for causing the scanner 121 to move from the inner position to the outer position with the stylus 122 outwardly traversing the disc record 4. This reduction gear device 133 is designed such that each rotation of the rotatable spindle 81 results in shift of the scanner 121 in a distance corresponding to the space between each two adjacent tracks on the grooved surface of the disc record 4.

The stylus clearing mechanism 140 comprises a pivot device 141 for pivoting the guide rail 123 about the longitudinal axis thereof for substantially vertically shifting the stylus 122 between inoperative and operative positions, a safety locking device 142 for holding the stylus 122 in the inoperative position clear of the groove on the disc record 4 for avoiding an erroneous shift of the stylus 122 to the operative position when no disc record is held in position on the stationary table A, and a damping device for permitting the stylus 122 to slowly descend to the operative position when said stylus 122 is to be engaged in the groove on the disc record and also permitting the stylus to quickly ascend to the inoperative position when said stylus 122 is to be cleared of the groove on the disc record 4.

The pivot device 141 includes a shaft 144 rigidly secured to the guide rail 123 and having one end journalled to a bearing block 105 and the other end rotatably extending through a bearing block 107 and rigidly mounted with an angle member 146, said angle member 146 being biased in one direction by a tension spring 145 to pivot the guide rail 123 and, therefore, the scanner 121, about the shaft 144 so that the stylus 122 is kept in the operative position.

The safety locking device 142 includes a locking lever 151 pivotally secured as at 150 to the chassis 51 and having one end engageable to the angle member 146 and the other end rotatably carrying a cam follower 149 which slidably engages a cammed periphery of a cam wheel 147 (FIG. 9) secured to the lower end of the shaft 84 below the chassis 51. A spring element, for example, a tension spring 148, is suspended between the locking lever 151 and a portion of the chassis 51 for forcibly biasing said lever 151 with the cam follower 149 firmly contacting said cammed periphery of the cam wheel 147. As shown in FIG. 9, the cammed periphery of the cam wheel 147 is formed with a detent recess 152 and, when the cam follower 149 engages in said detent recess 152, the first mentioned end of the locking lever 151 moves away from the angle member 146 for giving a freedom of pivotal movement of the angle member 146 about the shaft 144. It should be noted that the position of the detent recess 152 is selected such that release of the first mentioned end of the locking lever 151 from the angle member 146 takes place when and immediately after the operating knob 64 has been rotated sufficiently enough to permit the disc record 4 to be firmly sandwitched between the chuck 80 and the record mount 98.

The damping devide 143 includes a damper 155, filled therein with grease, silicon oil or like material having a relatively high viscosity, and a rod 154 having a substantially intermediate portion thereof situated within the damper 155 and formed on its periphery with a plurality of annular grooves 153. The damping device 143 further includes an operating lever 157 angularly biased in one direction by a tension spring 156 with one end thereof remote from the tension spring 156 pressing the rod 154 against the tension spring 145 whereby the angle member 146 is pivoted in such a way as to hold the stylus 122 in the inoperative position. This operating lever 157 can be pivoted against the tension spring 156 to permit that end thereof to disengage from the rod 154 in response to depression of a "play" button 160, said depression of said play button 160 being transmitted to the operating lever 157 through an intermediate lever 159 pivotable about the pivot 158.

It should be noted that a pulling force of the tension spring 156 which acts on the rod 154 when the stylus 122 is to be held in the inoperative position is greater than that of the tension spring 145 which acts on the angle member 146 so as to bring the stylus 122 to the operative position.

The damping device 143 operated in such a manner as follows. Assuming that the cam follower 149 is received in the detent recess 152 (FIG. 9) and, unless the play button 160 is depressed, the rod 154 is conditioned such as to pivot the angle member 146 with the stylus 122 held in the inoperative position. This is possible because the tension spring 156 acts on said rod 154 through the operating lever 157 overcoming the pulling force of the tension spring 145. If the play button 160 is subsequently depressed by the application of an external pushing force and locked in that position, the intermediate lever 159 is brought in position to pivot the operating lever 157 against the tension spring 156 with that end thereof separating away from the rod 154 and, therefore, the rod 154 slowly moves towards that end of the operating lever 157 while the pulling force of the tension spring 145 acting on the angle member 146 is transmitted to the rod 154 through said angle member 146 and the viscosity of grease, silicon oil or like viscous material within the damper 155 acts on said rod 154 to make the movement of the rod 154 dull. As the angle member 146 pivots urged by the tension spring 154 in this way, the shaft 144 is rotated with the guide rail 123 pivoting so as to permit the stylus 122 to correspondingly slowly descend towards the operative position.

On the other hand, upon release of the play button 160 from the depressed position, the intermediate lever 159 is brought in position to permit the operating lever 157 to pivot as urged by the tension spring 156. At this time, since the pulling force of the tension spring 156 is greater than that of the tension spring 145, the rod 154 can be relatively quickly moved so as to pivot the angle member 146 against the tension spring 146, resulting in that the stylus 122 is correspondingly quickly shifted towards the inoperative position clear of the groove on the disc record 4.

The manner by which the scanner 121 is returned to the outer position in which condition the stylus 122 is, when the latter is in the operative position, engaged in the outermost track of the groove on the disc record 4 will be described under the subsequent heading of "Mode Selector Unit."

Mode Selector Unit [FIGS. 4, 10, 11 and 12]

The mode selector unit includes, in addition to the aforesaid play button 160, "still" and "stop" buttons 161 and 162. While the play button 162 designates that, when it is operated or depressed, the video disc player is in position to perform the disc record in a normal manner, the still button 161 designates that, when it is operated or depressed, the video disc player is in position to permit the scanner 121 to repeatedly scan the same tracks to produce a substantial still picture and the stop button 162 designated that, when it is operated, it acts to permit the play button 160 to return to the original position from the depressed position so as to cease the performance of the disc record on the video disc player.

These buttons 160, 161 and 162 are respectively rigidly mounted on operating rods 167, 168 and 169 which have corresponding projections 164, 165 and 166, all of these rods 167, 168 and 169 being upwardly biased by associated spring elements, for example, compression springs 170, 171 and 172.

A locking plate 174 slidable between locked and released positions and normally biased in one direction towards the locked position by a tension spring 173 has an engagement step formed therein as at **174*a*, which engages the projection 164 so as to hold said button 160 in the depressed position when said locking plate 174 is moved to the locked position urged by the spring 173 with the projection 164 first causing the locking plate 174 to move against the spring 173 and then trapped by the step 174*a*. Release of the button 160 from the depressed position, i.e., disengagement of the engagement step 174*a* from the projection 164, can be effected in response to movement of a solenoid plunger 190 from a projected position to a retracted position. For this purpose, the locking plate 174 is associated with the solenoid plunger 190 through a shut-off lever 175 having one end rigidly connected to said lever 174 and the other end situated on the path of travel of an upright plate 191*a* rigidly mounted on an actuating lever 191 which is in turn connected to the solenoid plunger 190**.

The above mentioned release of the button 160 from the depressed position can also be effected when the stop button 162 is depressed by the application of an external pushing force. More specifically, as the button 162 is depressed, the projection 166 slides in contact with a cam edge, formed as at 174*b* in the locking plate 174, while it causes the locking plate 174 to move against the spring 173 with the step 174*a* disengaging from the projection 164 so that the play button 160 is permitted to return to the original position urged by the compression spring 170.

Depression of the play button 160 does not only cause the operating lever 157 to pivot against the tension spring 156 so as to permit the stylus 122 to slowly descend to the operative position in the manner as hereinbefore described, but also causes a pivot lever 178, pivotally supported as at 177 to a fixture 176, to pivot against a tension spring 179 so as to repress a slidable lever 180. As the slidable lever 180 is thus depressed, a retainer pin 181 on the slidable lever 180 disengages from a clutch operating lever 182 so as to permit the latter to pivot urged by a tension spring 183 whereby the drive and driven gears 135*a* and 135*b* of the clutch 135 are meshed to each other.

It should be noted that a pulling force of the tension spring 179 is selected to be greater than that of the tension spring 183 and, therefore, when the play button 160 is returned towards the original position from the depressed position in a manner as will be described later, the slidable lever 180 upwardly moves with the retainer pin 181 causing the clutch operating lever 182 to pivot against the tension spring 183 overcome by said tension spring 179, whereby the driven and drive gears 135*b* and 135*a* of the clutch 135 are disengaged from each other.

Subsequent depression of the still button 161 while the play button 160 is locked in the depressed position and the clutch 135 is, therefore, in position to permit the gears 135*a* and 135*b* of the clutch 135 to engage to each other, an operating lever 184 pivots about the pivot 185 against a tension spring 186, so disposed as to upwardly bias said lever 184 about the pivot 185, whereby a slider 187 is upwardly shifted. As the slider 187 is thus upwardly shifted, a pin 188 rigidly carried by said lever 187 engages to the clutch operating lever 182, causing the latter to pivot against the tension spring 183. As hereinbefore described, pivotal movement of the clutch operating lever 182 against the tension spring 183 results in disengagement between the gears 135*a* and 135*b* of the clutch 135 and, therefore, only transmission of the rotational force of the rotatable spindle 81 to the rope 124 for moving the scanner 121 from the outer position towards the inner position is interrupted and the stylus 122 is in position to repeatedly trace the same tracks on the disc record.

It has now become clear that, so long as the still button 161 is depressed by the continuous application of an external pushing force while the play button 160 is locked in the depressed position with the projection 164 engaged by the step 174*a*, still reproduction can be appreciated.

In case of removal of the external pushing force applied to the still button 161 while the play button 160 is still locked in the depressed position, the various parts associated with the button 161 operate in a substantially reverse manner and, therefore, the clutch 135 can be brought in position to engage the gears 135*a* and 135*b* to each other to transmit the rotational force of the rotatable spindle 81 to the scanner drive rope 134 as is the case of mere depression of the play button 160.

As hereinbefore described, return of the play button 160 can be effected when the stop button 162 is depressed by the application of an external pushing force. The stop button 162 can return to the original position by the action of the compression spring 172 immediately upon removal of the external pushing force. Furthermore, so long as the play button 160 is not depressed, the stylus 122 is held in the inoperative position clear of the groove on the disc record by the reason as hereinbefore described.

The actuating lever 191 having one end pivotally connected to the solenoid plunger 190 has the other end integrally formed with a rod 191*b* of a diameter smaller than the width of the actuating lever 191, said rod 191*b* slidably extending through a cylindrical block 193*a* carried by an idler carrying lever 193 for rotation about the longitudinal axis of its own. A compression spring 192 is mounted on the rod 191*b* and between a stop member 191*c*, secured on said rod 191*b*, and said cylindrical block 193*a* for biasing the latter towards the end extremity of the actuating lever 191.

As best shown in FIG. 8, the idler carrying lever have one end remote from the cylindrical block 193*a* rotatably mounted with the idler wheel 194 selectively engageable both to the return drive wheel 136 (FIG. 4) and to a rotatable member (not shown) coaxially mounted with the driven gear 135*b* for rotation together therewith. When the idler wheel 194 is engaged to said return drive wheel 136 and said rotatable member coaxial with the driven gear 135*b* of the clutch 135, the rotational force of the rotatable spindle 81 is transmitted to the rope 134 in a reverse direction so as to move the scanner 121 towards the outer position. This is achieved when the solenoid plunger 190 is moved to the retracted position in which condition the actuating lever 191 correspondingly moves against the compression spring 192 while the idler carrying lever 193 is pivoted against a tension spring 194*a* with the cylindrical block 193*a* receiving an energy exerted by the compression spring 192 in an axial direction as said spring 192 is compressed. When the solenoid plunger 190 is thus moved to the retracted position, the compression spring 192 cooperates with the tension spring 194*a* in such a way as to adjust the contact pressure exerted by the idler wheel 194 both to the return drive wheel 136 and the rotatable member coaxial with the driven gear 135*b* of the clutch 135.

Electrical Circuit [FIG. 13]

The electrical circuit shown in FIG. 13 is required to operate the solenoid plunger 190 in association with switching elements employed in the video disc player of the present invention.

The electrical circuit shown includes a flip-flop 200 operable in such a way that, when negative pulse is applied to a set input terminal 201, it generates a high level signal from an output terminal and, when negative pulse is applied to a reset input terminal 202, it generates a low level signal from the output terminal. The output terminal of the flip-flop 200 is connected to the base of a switching transistor 203 which is, when the high level signal from the flip-flop 200 is applied to the base thereof, triggered on to energize a solenoid coil 204 inserted between a power source and the collector of said transistor 203. Upon energization of the solenoid coil 204, the solenoid plunger 190 can be moved to the retracted position.

A switch 205 having a movable contact normally engaged to an "ON" contact is operated, so as to engage the movable contact to an "OFF" contact, in response to completion of adjustment of the operating knob 64. In other words, when the disc record is supplied completely onto the stationary table A with the central opening thereof receiving therein the projection 82*a* of the chuck 80, the movable contact of this switch 205 is engaged to the "OFF" contact. In this condition, if the operating knob 64 is operated, the switch 205 turns to engage to the "ON" contact to feed a negative pulse to the set input terminal 201 of the flip-flop 200 through a diode 206. Accordingly, the circuit so far described operates in such a way that, if the operating knob 64 is erroneously rotated during performance of the disc record, the solenoid plunger 190 is immediately moved to the retracted position. Retraction of the solenoid plunger 190 thus effected causes the play button 160 (then locked in the depressed position) to return to the original position and, at the same time, causes the scanner 121 to return to the outer position with the stylus 122 having held in the inoperative position, all in the manner as hereinbefore described.

The circuit shown further includes the reed switch 129 which is closed by the magnet 131, carried by the scanner 121, when the latter arrives at the inner position with the stylus 122 engaged in the innermost track of the groove on the video disc 4. Upon closure of this reed switch 129, a negative pulse is fed from a diode 207 to the set input terminal 201 of the flip-flop 200 and, therefore, the solenoid plunger 190 is moved to the retracted position in the same manner as hereinbefore described and the same result as hereinbefore described can be achieved.

The reed switch 128 which is closed by the magnet 130 carried by the scanner 121 when the latter arrives at the outer position is also included in the circuit shown. Upon closure of this reed switch 128, a negative pulse is fed to the reset input terminal 202 of the flip-flop 200 through a diode 209 and, therefore, the switching transistor 203 is triggered off to disenergize the solenoid coil 204. As a result thereof, the solenoid plunger 190 is biased to the projected position and the idler wheel 194 is disengaged from the rotatable member coaxial with the driven gear 135*b* of the clutch 135 and also from the return drive wheel 136 whereby return movement of the scanner 121 is interrupted.

The circuit shown further includes a fail-safe circuit, generally indicated by 210, which acts to render the solenoid plunger 190 to be moved to the retracted position when the play button 160 is erroneously operated or depressed before the disc record 4 has been completely held in position above the stationary table A with the central opening thereof substantially aligned with the chuck 80. For this purpose, the fail-safe circuit 210 includes a switch 211 which is closed only when the play button 160 is depressed, a photo-sensitive transistor 212 which will receive no incident light when the disc record 4 has been completely held in position above the stationary table A with the central opening thereof aligned with the chuck 80, and a transistor 213 which is triggered on to supply to the transistor 203 voltage which is obtained when the switch 211 is closed and, at the same time, when the photo-sensitive transistor 212 is conducting.

Although the present invention has been fully described by way of the preferred embodiment thereof, it should be noted that various changes and modifications are apparent to those skilled in the art. By way of example, the ball bearing 111 shown in FIG. 6 may be omitted if the opening of the annular plate 113 is suitably sized with respect to the diameter of the connecting rod 93. In addition, instead of embedding the magnet 109 in the body 82, it may be embedded in the record mount around the opening of the socket 99 and then covered with a suitable annular lining similar to that indicated by 110.

Furthermore, if the chuck 80 and the socket 99 in the record mount 98 are respectively shaped as shown in FIG. 6, the diameter of the socket 99 may be greater than the diameter of the projection 82*a* because the chuck 80 can be effectively aligned with the longitudinal axis of the rotatable spindle 81 in such a way that the cone 82*b* fits to the mating bottom 99*a*. Alternatively, if the diameter of the socket 99 is made to be equal to the diameter of the projection 82*a*, the bottom of the socket 99 may be flat should the depth of the socket 99 be sufficient enough to permit the peripheral face of the block 82 around the projection 82*a* to megnetically contact the record mounting surface 102.

Therefore, such changes and modifications should be construed as included within the scope of the present invention unless otherwise they depart therefrom.

What is claimed is:

1. A video disc player for use with a flexible foil-type disc, said player comprising:

a stationary table;

a motor-coupled rotatable spindle positioned with respect to said table for driving said flexible foil-type disc record about its center at a predetermined high speed while it hovers on a rotation-induced air cushion above the stationary table during the rotation thereof;

a record mount rigidly mounted on said rotatable spindle for supporting the disc record thereon in alignment with a central portion of the disc record while the remaining portion of the disc record rests on the stationary table when said record mount is not rotated, said record mount having a top surface positioned above the plane of said stationary table, said top surface having a peripheral portion radially downwardly inclined such that the inclined peripheral portion thereof is substantially contiguous with the plane of said stationary table, said record mount further having an inwardly recessed socket formed therein in alignment with the longitudinal axis of the rotatable spindle;

a cylindrical block for movement between engaged and disengaged positions and having an axially extending cavity formed therein, said cylindrical block further having one end formed with a downwardly extending projection engageable into said socket in said record mount, when said cylindrical block is moved to said engaged position, so as to clamp said disc record between said record mount and said cylindrical block for rotation together with said record mount;

an annular magnetic element embedded in either said block or said record mount and positioned to face the other of said record mount or said cylindrical block for effecting magnetic attraction between said block and said record mount thereby permitting said cylindrical block to rotate together with said record mount with said disc record sandwiched therebetween;

control means including an operating rod for movement between first and second positions such that when said operating rod is in said first position, said cylindrical block is in said disengaged position and when said operating rod is in said second position, said cylindrical block is in said engaged position, said operating rod having a land of a diameter greater than the diameter of said rod integrally formed on one end thereof, said cylindrical block having the other end formed with an opening, said opening having a diameter smaller than that of said land and through which a portion adjacent said one end of said rod loosely extends with said land situated inside said cavity, wherein when said rod is in said second position said land is suspended in the space within said cavity clear of the inside surface of said other end of said cylindrical block, and as said rod is upwardly moved towards said first position said land contacts said inside surface of said other end of said cylindrical block, said cylindrical block being upwardly shifted towards said disengaged position when said block is upwardly moved by said land of said operating rod as it moves to said first position; and a smoothing member operatively positioned between said operating rod and said cylindrical block for providing a low frictional contact between said rod and said block such that said cylindrical block is permitted to rotate under an inertial force substantially independent of said operating rod after said cylindrical block has been disengaged from said record mount rotated at the predetermined high speed.

2. A video disc player as claimed in claim 1, wherein said smoothing member comprises a ball bearing means having outer and inner rings with a plurality of balls interposed therebetween, said ball bearing means being mounted such that said outer ring is supported by said cylindrical block in alignment with said opening in said other end of said cylindrical block and said inner ring is mounted on said operating rod adjacent said one end thereof.

3. A video disc player as claimed in claim 1, wherein said control means further includes a connecting linkage having one end pivotally connected to the other end of said operating rod the other end carrying a cam follower, an operating knob, and a cam wheel rotatable together with said operating knob and having a cam surface to which said cam follower is slidingly engaged, wherein when said operating knob is rotated in one direction through a predetermined angle, said operating rod is moved from said first position to said second position for shifting said cylindrical block from said disengaged position to said engaged position to permit the cylindrical block to be mounted on the record mount with said projection extending through the central opening of said disc record into said socket and, when said operating knob is rotated in the opposite direction through the same angle, said operating rod is moved from said second position to said first position for moving said cylindrical block from said engaged position to said disengaged position.

* * * * *